US011637819B2

(12) United States Patent
Waterton et al.

(10) Patent No.: US 11,637,819 B2
(45) Date of Patent: Apr. 25, 2023

(54) ESTABLISHING CONNECTIVITY BETWEEN USER DEVICES

(71) Applicant: International Business Machines Corporation, Armonk, NY (US)

(72) Inventors: Thomas James Waterton, Southampton (GB); James Hewitt, Eastleigh (GB); Caroline J. Thomas, Eastleigh (GB); Richard Jacks, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 17/104,049

(22) Filed: Nov. 25, 2020

(65) Prior Publication Data

US 2022/0166761 A1 May 26, 2022

(51) Int. Cl.
*H04L 9/40* (2022.01)
*H04L 67/146* (2022.01)
*H04L 67/141* (2022.01)

(52) U.S. Cl.
CPC .......... *H04L 63/0492* (2013.01); *H04L 63/18* (2013.01); *H04L 67/141* (2013.01); *H04L 67/146* (2013.01)

(58) Field of Classification Search
None
See application file for complete search history.

(56) References Cited

U.S. PATENT DOCUMENTS

| 11,006,077 B1* | 5/2021 | Truong | H04W 12/02 |
| 2010/0235523 A1* | 9/2010 | Garcia | H04L 67/51 |
| | | | 709/228 |
| 2011/0271192 A1* | 11/2011 | Jones | G06F 3/0421 |
| | | | 709/227 |

(Continued)

FOREIGN PATENT DOCUMENTS

| CN | 108718299 A | 10/2018 | |
| WO | WO-2013163634 A1 * | 10/2013 | H04L 63/08 |

OTHER PUBLICATIONS

"MONZO Help—Paying someone", MONZO, downloaded from the Internet on Oct. 13, 2020, 2 pages, <https://monzo.com/help/monzo-with-friends/how-to-pay-someone>.

(Continued)

*Primary Examiner* — Arezoo Sherkat
(74) *Attorney, Agent, or Firm* — Erika R. DeCosty

(57) ABSTRACT

A computer-implemented method, computer program product, and computer system is provided for establishing connectivity between user devices. The computer-implemented method includes: broadcasting a message to running processes on an operating system of the first user device to indicate that a requesting application is looking for a live connection channel to attempt discovery with a second user device to ascertain virtual proximity of the first user device with the second user device. The computer-implemented method further includes receiving a response from a live connection channel and attempting to verify pairing via the live connection channel to confirm a virtual proximity of the second user device with the first user device. The pairing provides information for establishing a subsequent connection between the first and second user devices via the requesting application.

20 Claims, 7 Drawing Sheets

(56) References Cited

U.S. PATENT DOCUMENTS

| | | | | |
|---|---|---|---|---|
| 2012/0239818 | A1* | 9/2012 | Defayet | H04L 67/148 709/228 |
| 2013/0343542 | A1* | 12/2013 | Rosati | H04L 63/0492 380/270 |
| 2014/0122730 | A1* | 5/2014 | Burch | H04L 67/14 709/228 |
| 2014/0149512 | A1* | 5/2014 | Leitch | H04L 67/1061 709/204 |
| 2015/0244807 | A1 | 8/2015 | Shoemake | |
| 2016/0112521 | A1* | 4/2016 | Lawson | H04L 67/02 709/227 |
| 2016/0162250 | A1* | 6/2016 | Dunn | G06F 3/0482 345/1.1 |
| 2017/0264446 | A1 | 9/2017 | Rose | |
| 2018/0110081 | A1 | 4/2018 | Serna | |
| 2020/0008035 | A1 | 1/2020 | Srivatsa | |
| 2020/0174767 | A1* | 6/2020 | Hashimoto | G06F 9/44505 |
| 2020/0358755 | A1* | 11/2020 | Abdul | H04W 12/084 |

OTHER PUBLICATIONS

"Proximity and cross device communication", Nearby | Google Developers, downloaded from the Internet on Oct. 13, 2020, 2 pages, <https://developers.google.com/nearby>.

"Smartphone and Cross-Platform Communication Toolkit—T4SM", National Instruments, downloaded from the Internet on Oct. 13, 2020, 13 pages, <http://sine.ni.com/nips/cds/view/p/lang/en/nid/210042>.

"We have some new updates for you", Blogs, Skype, Microsoft, downloaded from the internet on Oct. 13, 2020, 4 pages, <https://www.skype.com/en/blogs/>.

Jonnalagadda, Harish, "How to set up payments and send money on WhatsApp for Android", ANDROIDCENTRAL, Last updated Feb. 13, 2020, 9 pages, <https://www.androidcentral.com/how-set-and-send-money-whatsapp-pay-android>.

Mell et al., "The NIST Definition of Cloud Computing", Recommendations of the National Institute of Standards and Technology, NIST Special Publication 800-145, Sep. 2011, 7 pages.

* cited by examiner

ESTABLISHING CONNECTIVITY BETWEEN USER DEVICES

BACKGROUND

The present invention relates to connectivity between user devices, and more specifically, to establishing connectivity between user devices based on an initial connection.

Devices may physically detect nearby devices in order to connect with another device or connect to a nearby service. For example, a Digital Living Network Alliance (DLNA) offers a mechanism for sharing media between multimedia devices over a home network. Such technology enables devices to be able to detect media servers on a network, and applications are then able to use platform services on devices to detect related devices. Such solutions only help with devices that are physically co-located.

In another example, a user of a banking application on their smartphone can open the "Nearby Contacts" option from the payments screen and the banking application will ask the smartphone operating system to detect nearby devices. The operating system may use various short-range communication technologies to do this, such as Bluetooth™, near field communication (NFC), etc. The operating system will present a list of discovered nearby devices to the banking application and the banking application will present these to the user. This is very useful when a user in in close physical proximity to another user and wishes to interact with them, for example, by sending a payment via their banking application.

SUMMARY

According to an aspect of the present invention there is provided a computer-implemented method for establishing connectivity between user devices. The computer-implemented method includes broadcasting a message to running processes on an operating system of the first user device to indicate that a requesting application is looking for a live connection channel to attempt discovery with a second user device to ascertain virtual proximity of the first user device with the second user device. The computer-implemented method further includes receiving a response from a live connection channel. The computer implemented method further includes attempting to verify pairing via the live connection channel to confirm a virtual proximity of the second user device with the first user device, wherein the pairing provides information for establishing a subsequent connection between the first and second user devices via the requesting application.

According to another aspect of the present invention there is provided a computer system for establishing connectivity between user devices. The computer system includes one or more computer processors, one or more computer readable storage media, and program instructions stored on the computer readable storage media for execution by at least one of the one or more processors. The program instructions include instructions to broadcast a message to running processes on an operating system of the first user device to indicate that a requesting application is looking for a live connection channel to attempt discovery with a second user device to ascertain virtual proximity of the first user device with the second user device. The program instructions further include instructions to receive a response from a live connection channel. The program instructions further include instructions to attempt to verify pairing via the live connection channel to confirm a virtual proximity of the second user device with the first user device, wherein the pairing provides information for establishing a subsequent connection between the first and second user devices via the requesting application.

According to an aspect of the present invention there is provided a computer program product for establishing connectivity between user devices. The computer program product includes one or more computer readable storage media and program instructions stored on the one or more computer readable storage media. The program instructions include instructions to broadcast a message to running processes on an operating system of the first user device to indicate that a requesting application is looking for a live connection channel to attempt discovery with a second user device to ascertain virtual proximity of the first user device with the second user device. The program instructions further include instructions to receive a response from a live connection channel. The program instructions further include instructions to attempt to verify pairing via the live connection channel to confirm a virtual proximity of the second user device with the first user device, wherein the pairing provides information for establishing a subsequent connection between the first and second user devices via the requesting application.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1:
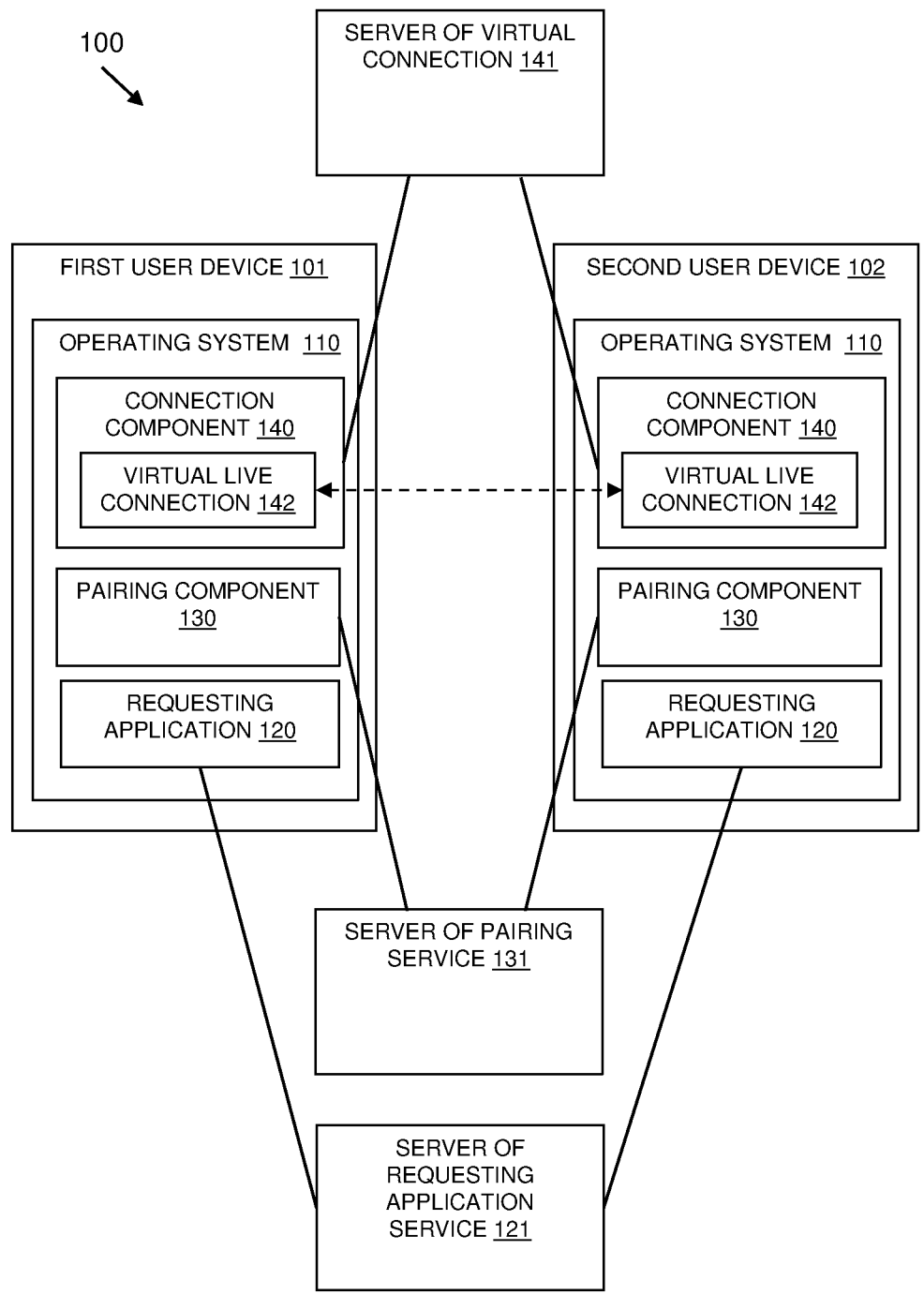
FIG. 1 is a schematic diagram of an example embodiment of a system provided at first and second user devices in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The present invention relates to connectivity between user devices, and more specifically, to establishing connectivity between user devices based on an initial connection.

In various embodiments of the present invention, methods, computer program products, and systems are provided for establishing additional connections between user devices based on an existing virtual proximity of the devices. Virtual proximity is defined as a concept of an online closeness and connection between users via their user devices. For example, users of user devices may be in communication via a connection channel or may share documents or other connections. The connection may be between two or more users. Users in virtual proximity will be contacts that know or have some connection to each other and communicate via digital means.

Oftentimes, two or more users who are in virtual proximity but not in physical proximity need to quickly share information between their devices. In such instances, a user cannot use DLNA or the "nearby friends" feature when the two or more users are not in physical proximity. In such instances, a user may need to text, email, call or a similar form of communication in order to share information such as a request code, account information, or other vital information with another user. Accordingly, embodiments of the present invention recognize the need to quickly and accurately share such information from one user to another when devices are not in physical proximity with each other.

Embodiments of the present invention further recognize the security risk in sending pairing codes by a third party. Embodiments of the present invention utilize cryptographically signed or encrypted payloads to verify details within the payload.

In an embodiment, subsequent connection between user devices is established using pairing components operating on operating systems of the user devices to provide pairing between user devices on behalf of applications running on the user devices. The pairing components may use various pairing verification techniques, such as pairing codes registered with a payload at a pairing service for a limited amount of time.

The pairing components look for existing live connection channels between user devices that show a virtual proximity of the users of the user devices. This may be carried out by a pairing component on a user device broadcasting a message to running processes on the operating system of the user device to indicate that a requesting application on the user device is looking for a live connection channel to attempt discovery of other user devices to ascertain virtual proximity of the user devices. Potential live connection channels can then respond to the broadcast and attempt to verify pairing via the live connection channel to establish a virtual proximity of the other user device.

Embodiments of the present invention improve upon the foregoing deficiencies of where two or more users who already have some form of digital or virtual connection established, want to connect with each other in some other digital or virtual service, such as another application being used by the users.

Referring to FIG. 1, a block diagram 100 shows an example embodiment of the described system including a first user computing device 101 and a second user computing device 102. Although the diagrams show two user devices 101, 102, the described method and system may be applied to a plurality of user devices. A user device 101, 102 may be any form of computing device via when connection may be made with other user devices 101, 102.

In the example embodiment, both user devices 101, 102 have operating systems 110 on which a pairing component 130 is provided. The pairing components 130 are each in remote communication with a server 131 providing a pairing service, referred to as a pairing server, at which pairing codes or keys may be registered and verified. The pairing components 130 provide the described functionality of identifying other user devices in virtual proximity to a first user device.

The pairing components 130 may be known pairing components of a pairing service for identifying physically proximate contacts to a user device. The described method may extend the concept of "nearby friends" to include virtual vicinity, which would cover anyone a user is communicating with digitally at the time. Using the described method "nearby friends" would not be limited to user devices physically near a user's device but would also include user devices belonging to other people that the user has a current virtual connection with. Alternatively, the virtual proximity of the described method may be used independently as provided by a separate pairing service.

Each user device 101, 102 has a requesting application 120 that may wish to use the functionality of the pairing component 130 to identify and verify virtual proximity user devices. The requesting applications 120 on the user device 101, 102 are each in remote communication with a server 121 providing the application service, referred to as the requesting application server.

In an embodiment, the pairing components 130 of the user devices 101, 102 use live virtual connections 142 of connection components 140 to determine virtual proximity of other user devices. In an embodiment, a connection component 140 of a user device 101, 102 provides a connection service at a remote server 141, referred to as a connection server. A live virtual connection 142 between a first and second user device 101, 102 is used to verify pairing, for example, by exchange pairing codes, to confirm a virtual proximity and to establish a subsequent connection between the requesting applications 120 of the user devices 101, 102.

A live virtual connection 142 that the user devices 101, 102 are both connected to may include, but is not limited to: the same video conference service; instant messaging service; online storage service; shared online document; etc. A "live connection" may be a real-time communication service or, in the case of a chat service, limited to contacts that have received/transmitted messages from/to each other within a predetermined time period (for example, within the last 15 minutes). A "live connection" may also be a live shared document that two users are interacting with.

As a practical example used throughout the description for example purposes, two users may be contacts in the form of friends or associates who are on a live Voice over Internet Protocol (VoIP) call (i.e. a live virtual connection 142) using their user devices in the form of their smartphones. A first user wishes to make a payment to the other user using a banking application (i.e. a requesting application 120) on the first user's smartphone. Using the described method, the banking application on the first user device can interact with a pairing component (i.e. pairing component 130) to pair the first user device to other user devices which are in virtual proximity to the first user device, (i.e. have a live connection with the first user device). The pairing component will identify the VoIP call with the second user device and pair the first and second user devices enabling the banking application to identify the virtual contact and receive the banking particulars from the second user device. This works in a similar way to finding physically nearby user devices, for example, by Bluetooth or NFC connections, but instead of close physical proximity, live online connections are identified.

Figure 2:
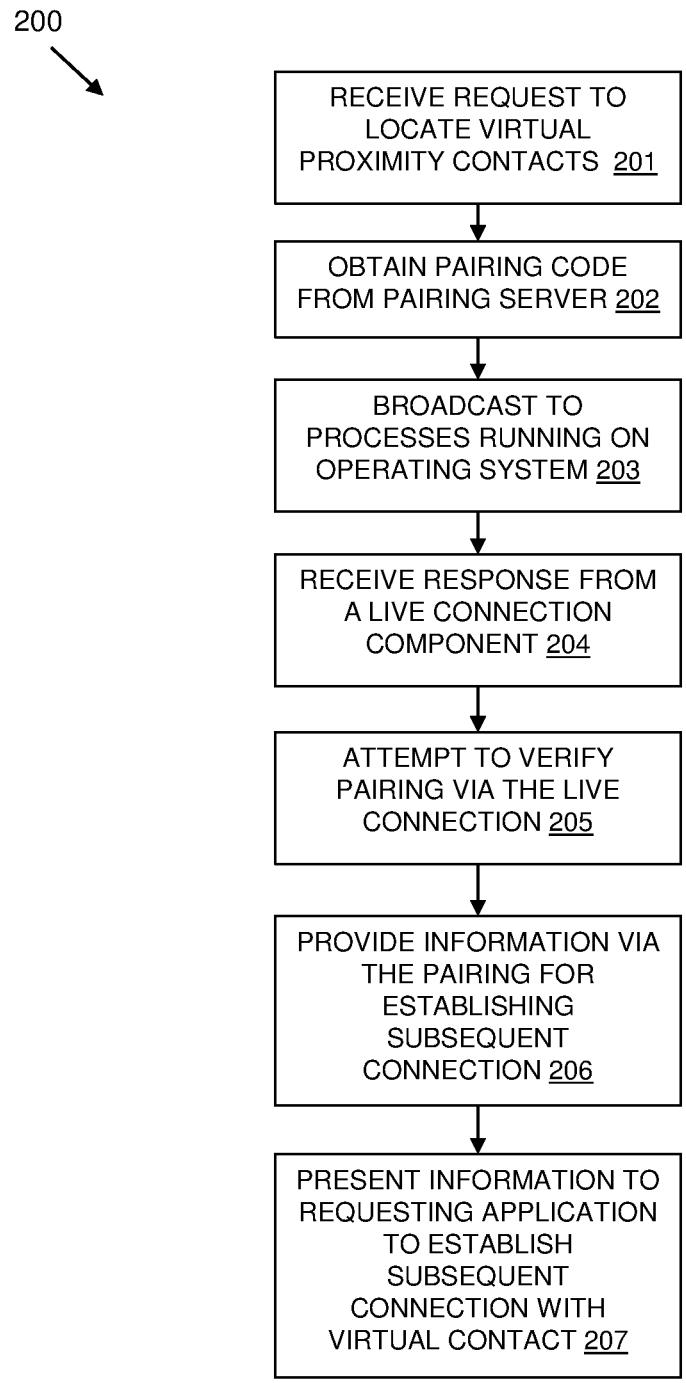
FIG. 2 is a flow diagram of an example embodiment of a method carried out at a pairing component in accordance with the present invention.

Referring to FIG. 2, a flow diagram 200 shows an example embodiment of a method carried out by a pairing component at a user device 101. The pairing component may be an application programming interface (API) providing functionality for other applications executing on the operating system of the user device 101.

The method may receive 201 a request to locate virtual proximity contacts (for example, "virtual friends" or other contacts with virtual connections to the user) from a requesting application on the user device 101. The method may obtain 202 pairing data for verifying a pairing, such as a unique pairing code from a pairing server that is available for a limited amount of time or other information required for a pairing verification process.

The method may broadcast 203 to running processes on the operating system of the first user device to indicate that an application is looking for a live connection channel to attempt discovery with other user devices to ascertain virtual proximity of the first user device with other user devices. The broadcasting 203 may include two directions for pairing, a first direction to attempt discovery of a second user device and receive a pairing code, and a second direction to share a pairing code to be discovered by the second user device.

A response may be received 204 from a live connection component that a virtual proximity contact may be found via the live connection. More than one response may be received from different live connections that may potentially discover different virtual proximity contacts.

The method may attempt 205 to verify pairing via the live connection, for example, by exchanging pairing codes. In one embodiment, once a pairing code has been sent and received via a live connection, the codes may be verified at the pairing server.

The method may provide 206 information via the pairing for establishing a subsequent connection via the requesting application. This may include user identification and identification of a requesting application. This information may be cryptographically protected by the pairing component. The pairing component may present 207 the information from one or more discovered virtual proximity contacts to the requesting application to establish a subsequent connection with one or more virtual contacts.

The method relies on delivering information over third party applications using a third party service of the live connection and such third party services may not be trusted. Therefore, cryptographic functionality may be provided by the pairing service and used to secure the connection by, for example, cryptographically signing or encrypting a payload. A payload is the part of transmitted data that is the actual intended message. This ensures that the contents of the pairing request (for example, who the users are and what other applications they might want to use) would not be available to the third party applications.

Figure 3:
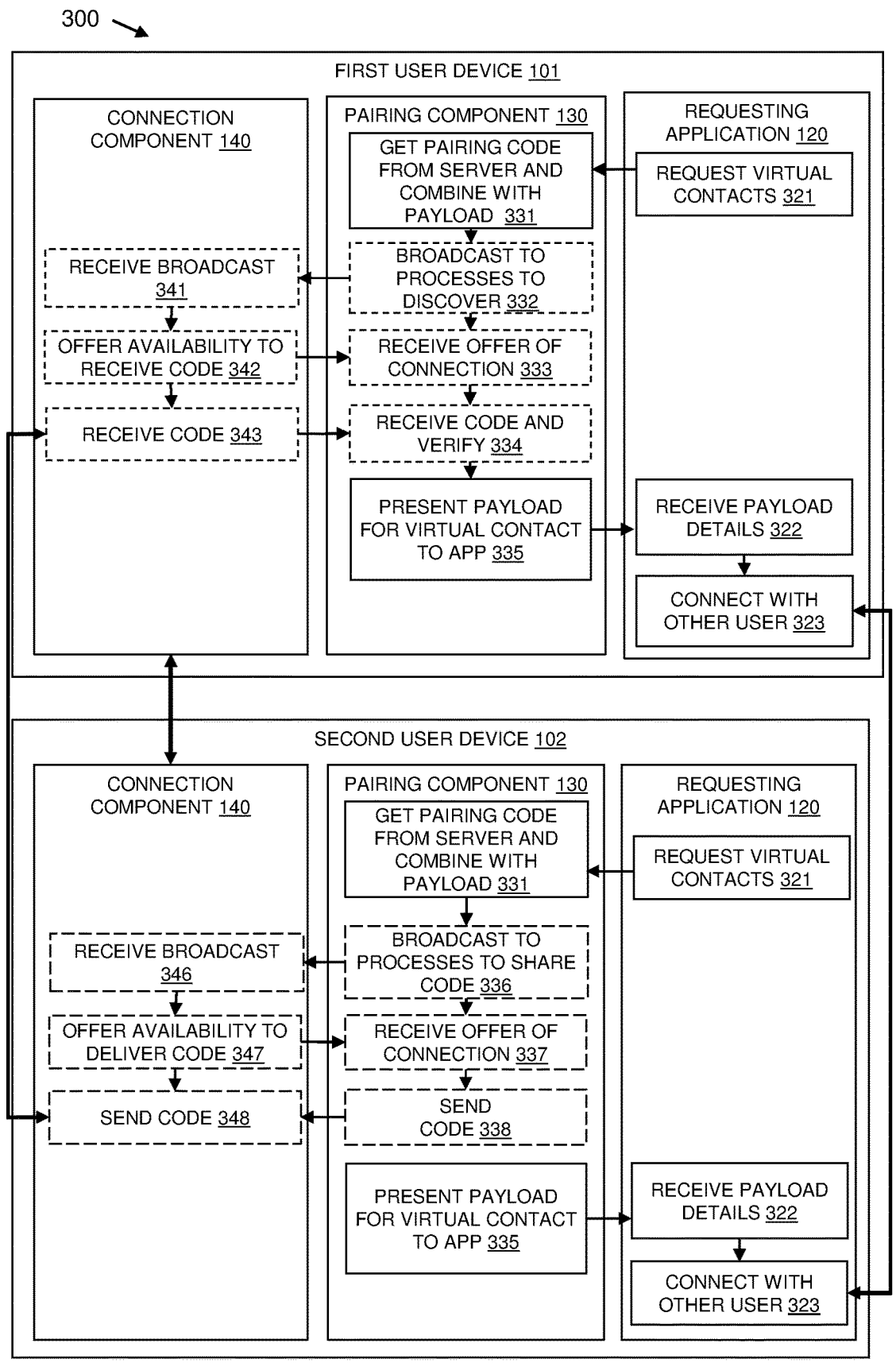
FIG. 3 is a swim-lane flow diagram of the components of FIG. 1 at first and second user devices in accordance with an example embodiment of the present invention.

Referring to FIG. 3, an example swim-lane flow diagram 300 is shown as carried out at the components of example first and second user devices 101, 102 of a requesting application 120, a pairing component 130, and a connection component 140. The equivalent and complementary method may be carried out at each user device 101, 102 when acting as a discoverer or discoveree of virtual proximity user devices.

The described method shows the connection of first and second user devices 101, 102; however, this may be extending to connecting more than two devices at the same time.

The method may start with a request for virtual contacts 321 to be found initiated by users of a same requesting application 120 on the first and second user devices 101, 102. Both users may activate the request on their respective user devices 101, 102. The requesting application 120 on each user device 101, 102 may use a pairing component 130 provided on an operating system of the first and second user devices 101, 102 to transmit and detect pairing codes.

A payload may be provided with the request 321 from the requesting application 120 providing information required to be shared by the requesting applications 120, such as an identification of the requesting application 120, and a user name at the requesting application 120. The payload may be registered with a unique pairing code that is stored on a pairing server (for example, a cloud server providing the pairing service) for a limited amount of time. The pairing code may be broadcast to pairing components 130 of listening user devices 101, 102, which can look up the binary payload. The pairing components 130 get 331 the pairing code from the server and combine with the payload. This may include using cryptographic operations to protect the payload.

The pairing component 130 on each of the user devices 101, 102 then attempts to detect other user devices 102, 101 in virtual proximity by identifying live connections between user devices and using the live connection to verify pairing. In this example case, there is a live connection using the connection components 140 of the first and second user devices 101, 102.

The method is described below with the first user device 101 detecting the second user device 102 by receiving a code sent from the second user device 102. The same method is carried out simultaneously with the endpoints switched for the second user device 102 to detect the first user device 101. However, it should be appreciated that only one direction of the methods needs to complete. In the first instance, the steps shown in broken lines is carried out. In the second instance, the steps are carried out by the opposing party.

The pairing component 130 of the first user device 101 may broadcast 332 a message to processes running on the operating system that a requesting application 120 is attempting to discover virtually proximate user devices. The running processes may be applications or communication components on the operating system (for example, web conference applications, instant messaging applications, phone functionality, etc.) that may have live connections with other user devices.

A connection component 140 running on the operating system of the first user device 101 may receive 341 the broadcast message from the pairing component 130 and may offer availability 342 as a live connection to other user devices to receive pairing codes.

The pairing component 130 of the second user device 102 may broadcast 336 a message to processes running on the operating system that an application is attempting to share pairing codes.

A connection component 140 running on the operating system of the second user device 102 may receive 346 the broadcast message from the pairing component 130 and may offer availability 347 as a live connection to other user devices to deliver pairing codes.

The pairing component 130 at the second user device 102 receives 337 the offer of connection via the connection component 140 and sends 338 the pairing code to the connection component 140 that sends 348 the pairing code to the connection component 140 on the first user device 101 via the live connection.

The pairing component 130 at the first user device 101 receives 333 the offer of connection via the connection component 140 and receives and verifies 334 the pairing code received 343 via the live connection at the connection component 140.

Once the pairing components 130 of at least one of the first and the second user devices 101, 102 have received and verified 334 a pairing code, the pairing component 130 may present 335 the payload identifying the virtual contact to the requesting application 120. The requesting application 120 may receive 322 the payload and may then connect 323 with the virtual contact, thereby establishing the subsequent connection between the first and second user devices 101, 102.

The described method provides value in many scenarios where two or more devices are not physically co-located, but where the user devices do already share a virtual connection of some kind. The method establishes a subsequent connection channel between user devices which are already virtually connected. The method uses ad-hoc, long-distance connection channels that are configured between users of different user devices without the need for pre-configuration. This provides a quick, low-friction method to connect to other users based dynamically on context-aware user behavior.

The following specific example is described to illustrate the described method. As background, the pairing component registers a payload with a unique pairing-code that is then stored on a cloud pairing server for a limited amount of time. The registration is instigated by a requesting application that wants to create a connection. The pairing server broadcasts the pairing code to listening devices. Those devices can then look up the binary payload from the cloud servers.

In this example, Aki and Mikael are two users who are not physically proximate and are having a conversation on a VoIP service. The discussion of a payment that needs to be made from Aki to Mikael comes up. Aki and Mikael both open a banking application on their phones, and go to the "Payments" screen and select "Nearby Contacts".

The banking applications on each of the phones uses a pairing component API to attempt to both transmit and detect pairing codes.

Aki's phone detects Mikael's phone and in response, the following steps are performed:

The pairing component API on Aki's phone broadcasts a message to running applications on Aki's phone to say that a requesting application is attempting discovery.

The VoIP service responds saying that it is available as a channel to receive pairing codes.

The pairing component API on Mikael's phone broadcasts a message to running applications on Mikael's phone to say that an application is attempting to share pairing codes.

The VoIP service responds saying that it is available as a channel to deliver pairing codes.

The pairing component API on Mikael's phone hands the VoIP service a pairing code to deliver.

The VoIP service knows that the other end of its connection, Aki, is attempting discovery.

The VoIP service passes the pairing code from Mikael's phone to Aki's phone.

The VoIP service on Aki's phone passes the pairing code to the pairing component API.

The pairing component API on Aki's phone, on identifying a pairing code that has arrived via a live connection, looks up the payload on the cloud pairing server, using the pairing code.

The pairing component API on Aki's phone passes the details of the payload to the banking application. In a basic example, the payload may be a plain text username allowing the banking application on Aki's phone to identify the username for Mikael in that service. The payload may be encrypted or signed to prevent the VoIP service from tampering with it.

The banking application on Aki's phone displays Mikael's details as a possible connection, identifying that the payload was sent over a third party service (the VoIP service).

Aki selects Mikael from the nearby contacts list in the banking application. The banking application on Aki's phone uses the pairing component API to collect the payload associated with Mikael's pairing code. Aki sends the payment via the banking application.

It should be appreciated that the same steps as recited above may be performed based on Mikael's phone detecting Aki's phone, by simply switching the endpoints of the steps.

The above is an example scenario of a banking application; however, other scenarios may use the described concept. For example, when one user wants to share a file with another user who is not co-located, the same mechanism may be used to quickly and easily identify another person that the user is connected to over any virtual connection (for example, short messaging service, email, web conference, instant messaging, etc.).

Allowing third parties to send pairing codes introduces potential for security issues. To guard against them, applications may use cryptographically signed or encrypted payloads, or introduce further steps to verify the details within the payload. In the banking application case, a banking application may use a payload that is an encrypted version of the users account identity that cannot be decrypted by the third party. The payload may be verified on receipt using the banking application servers to be able to present the account holder's name and photograph for the user to confirm they have the correct person. This would prevent the third party from being able to inject their own account as payload and intercepting money transfers. It would also prevent the third party from being able to associate a given user to their bank account.

Figure 4:
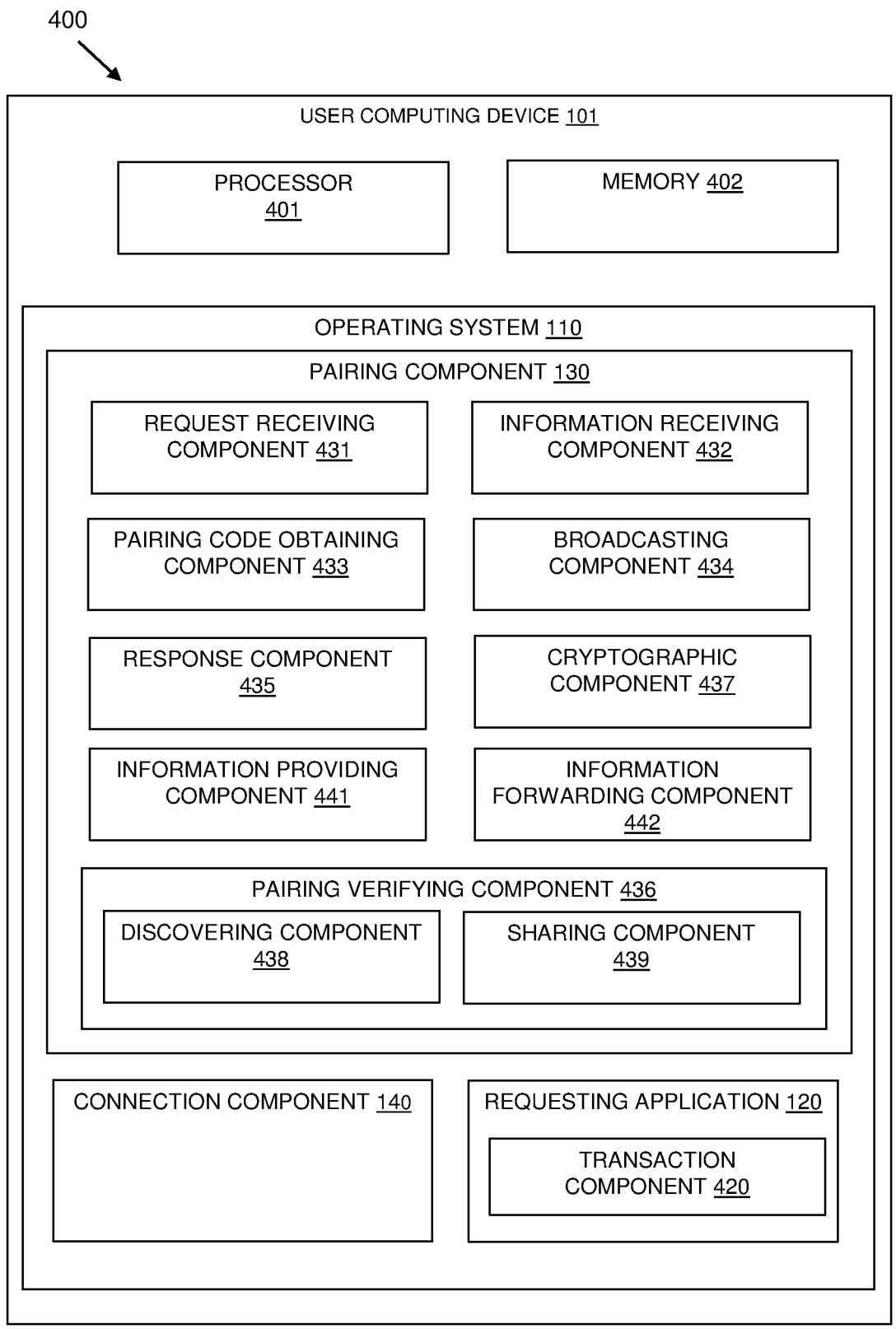
FIG. 4 is a block diagram of an example embodiment of a system in accordance with the present invention.

Referring to FIG. 4, a block diagram 400 shows a user computing device 101 that includes at least one processor 401, a hardware module, or a circuit for executing the functions of the described components which may be software units executing on the at least one processor. Memory 402 may be configured to provide computer instructions, in the form of an operating system 110 and applications, to the at least one processor 401 to carry out the functionality of the components.

The user computing device 101 may include an operating system 110 for executing a pairing component 130, a connection component 140, and a requesting application 120 as described in FIG. 1.

The pairing component may include a request receiving component 431 for receiving a request from the requesting application 120 to identify virtual contacts and an information receiving component 432 for receiving information from the requesting application 120 for use in establishing the subsequent connection between the user computing device 101 and another user device via the requesting application 120. The pairing component 130 may include a pairing code obtaining component 433 for obtaining pairing codes from a pairing server for the request.

In an embodiment, the pairing component 130 includes a broadcasting component 434 for broadcasting a message to running processes on the operating system 110 of the user computing device 101 to indicate that a requesting application 120 is looking for a live connection channel to attempt discovery with other user devices to ascertain virtual proximity. In an embodiment, the pairing component 130 includes a response component 435 for receiving a response from one or more connection components 140 on the operating system 110.

In an embodiment, the pairing component 130 includes a pairing verifying component 436 for attempting to verify pairing via the live connection channel to confirm a virtual proximity of another user device. In an embodiment, the pairing component 130 includes an information providing component 441 for use in the pairing verification providing information for establishing the subsequent connection. The pairing component 130 may include a cryptographic component 437 for securing the information provided for establishing the subsequent connection using cryptographic operations. The cryptographic component 437 may access a remote cryptographic service.

In an embodiment, the pairing verifying component 436 includes a discovering component 438 for broadcasting a first message to running processes to indicate that the requesting application 120 is attempting to discover and receiving a response to the first message by indicating availability to receive paring codes via the live connection channel and a sharing component 439 for broadcasting a second message to running processes to indicate that the requesting application 120 is attempting to share pairing codes and receiving a response to the second message by indicating availability to deliver the paring codes via the live connection channel.

In an embodiment, the pairing component 130 includes an information forwarding component 442 for forwarding information for establishing a subsequent connection to the requesting application 120 once the pairing has been verified.

In an embodiment, the pairing component 130 may be integrated with a pairing component for discovering physically proximate user devices using near field communication protocols.

In an embodiment, the requesting application 120 includes a transaction component 420 for using the subsequent connection for transactions between the requesting application 120 and a corresponding application on another user device.

Figure 5:
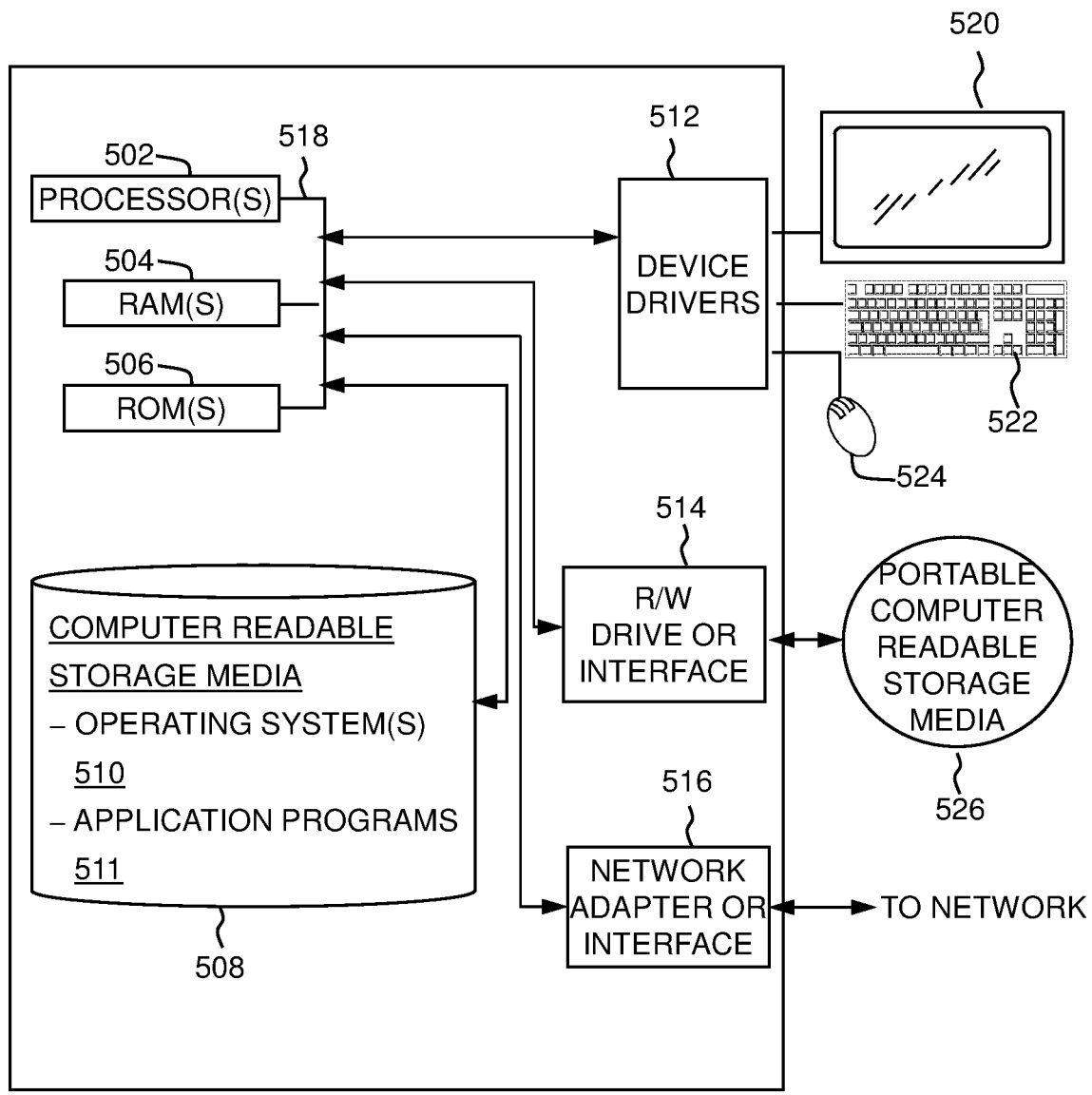
FIG. 5 is a block diagram of an embodiment of a computer system or cloud server in which the present invention may be implemented.

FIG. 5 depicts a block diagram of components of a computing system as used for the user devices and servers, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The computing system can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the pairing component 130, requesting application 120, and connection component 140, are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 514 to read from and write to one or more portable computer readable storage media 526. Application programs 511 on the computing system can be stored on one or more of the portable computer readable storage media 526, read via the respective RAY drive or interface 514 and loaded into the respective computer readable storage media 508.

The computing system can also include a network adapter or interface 516, such as a TCP/IP adapter card or wireless communication adapter. Application programs 511 on the computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, RAY drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
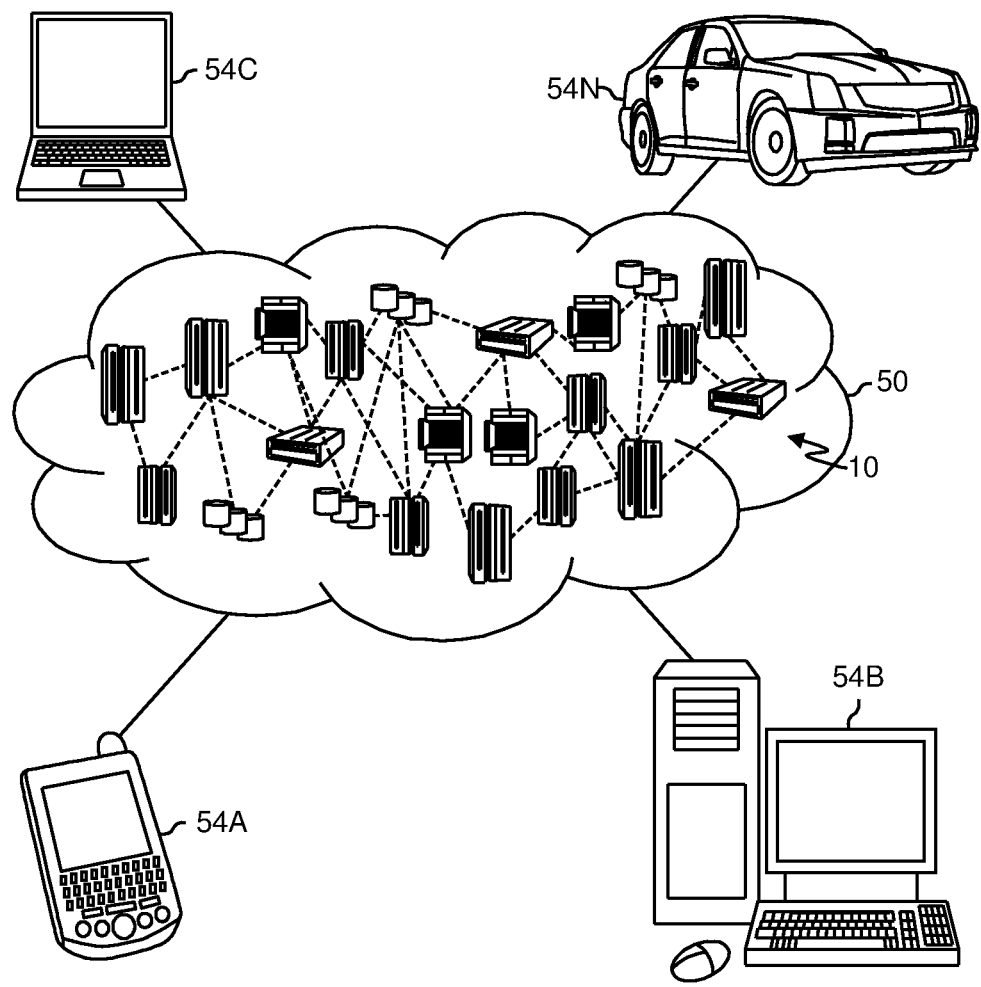
FIG. 6 is a schematic diagram of a cloud computing environment in which the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
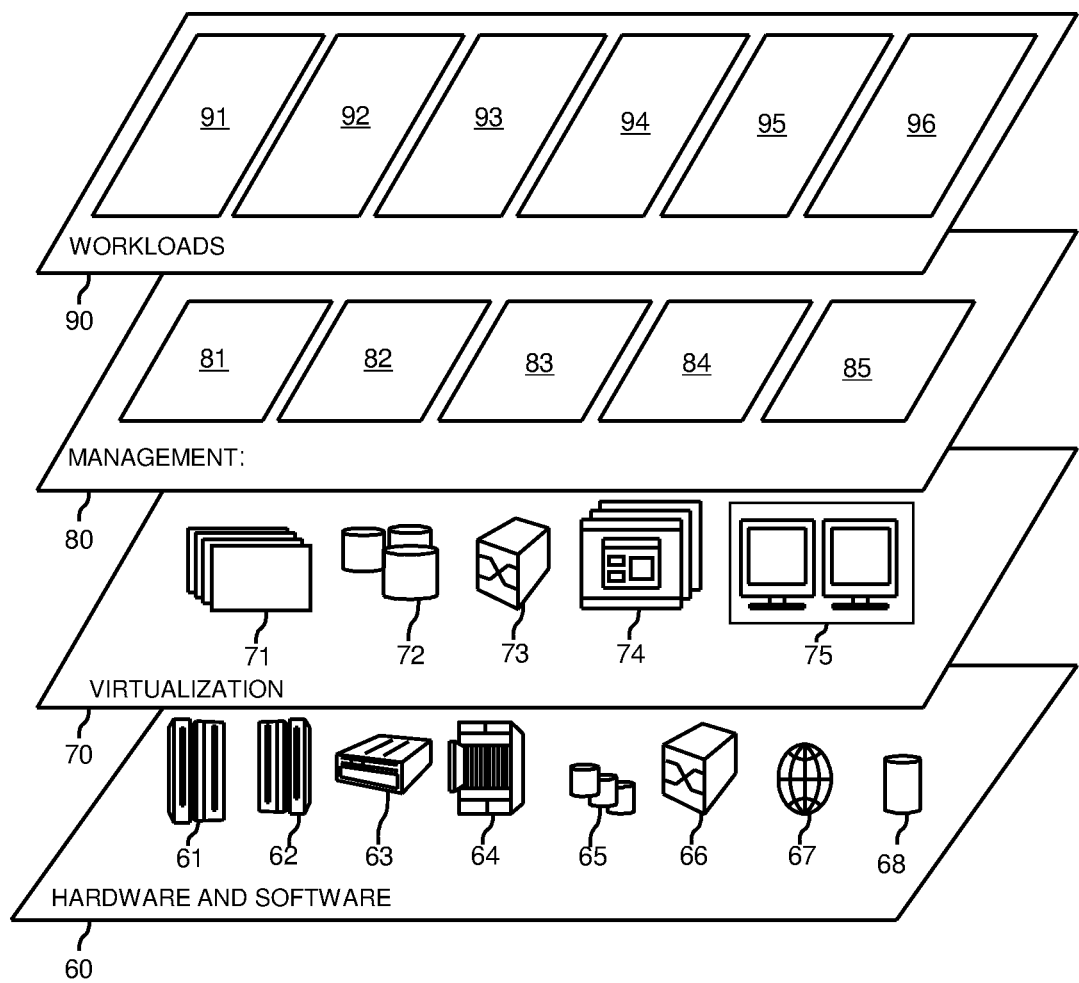
FIG. 7 is a diagram of abstraction model layers of a cloud computing environment in which the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual proximity processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for establishing connectivity between user devices, comprising:
    receiving a request, from a requesting application, to determine whether a first user device and a second user device are in virtual proximity with each other, where two devices are considered as being in virtual proximity based, at least in part on, determining one or more of: (i) a user of the second user device is a contact of user of the first user device, (ii) the user of the first user device is a contact of user of the second user device, (iii) the first and second user devices can be connected in communication with each other over a live connection channel, and (iv) the first and second user devices have communicated with each other by digital means;
    broadcasting a message to running processes on an operating system of a first user device to indicate that the requesting application is looking for a live connection channel to attempt discovery with a second user device as a part of ascertaining virtual proximity of the first user device with the second user device;
    receiving a response from a live connection channel; and
    verifying a pairing, between the first and second user device, via the responding live connection channel to confirm a virtual proximity of the second user device with the first user device, wherein the pairing includes broadcasting one or more pairing codes and communicating information for establishing a subsequent connection between the first and second user devices via future requests from the requesting application.

2. The computer-implemented method as claimed in claim 1, wherein the information for establishing the subsequent connection comprises secured information using cryptographic operations.

3. The computer-implemented method as claimed in claim 1, wherein the pairing uses the one or more pairing codes registered for a payload at a pairing service for a limited amount of time and includes sending a cryptographically signed and/or encrypted payload via the live connection channel.

4. The computer-implemented method as claimed in claim 1, further comprising:
    receiving a request to identify virtual contacts from the requesting application and receiving information from the requesting application for use in establishing the subsequent connection between the first and second user devices via the requesting application.

5. The computer-implemented method as claimed in claim 1, wherein the information for establishing a subsequent connection includes information identifying the requesting application and identifying a user.

6. The computer-implemented method as claimed in claim 1, wherein the live connection channel is selected from the group consisting of: a channel that has a live real-time communication, a messaging channel that has sent or received a message within a predefined time period, and channel sharing a document for collaboration.

7. The computer-implemented method as claimed in claim 1, further comprising:
    broadcasting a first message to running processes to indicate that the requesting application is attempting to discover and receiving a response to the first message by indicating availability to receive paring codes via the live connection channel.

8. The computer-implemented method as claimed in claim 1, further comprising:
    broadcasting a second message to running processes to indicate that the requesting application is attempting to share the one or more pairing codes and receiving a response to the second message by indicating availability to deliver the paring codes via the live connection channel.

9. The computer-implemented method as claimed in claim 1, further comprising:
    using the subsequent connection for transactions between the requesting application and a corresponding application on the second user device.

10. A computer system for establishing connectivity between user devices, comprising:
    one or more computer processors;
    one or more computer readable storage media; and
    computer program instructions, the computer program instructions being stored on the one or more computer readable storage media for execution by the one or more computer processors, and the computer program instructions including instructions to:
    broadcast a message to running processes on an operating system of a first user device to indicate that a requesting application is looking for a live connection channel to attempt discovery with a second user device as a part of ascertaining virtual proximity of the first user device with the second user device;
    receive a response from a live connection channel; and
    verifying a pairing, between the first and second user device, via the responding live connection channel to confirm a virtual proximity of the second user device with the first user device, wherein the pairing includes broadcasting one or more pairing codes and communicating information for establishing a subsequent connection between the first and second user devices via future requests from the requesting application.

11. The computer system as claimed in claim 10, wherein the information for establishing the subsequent connection comprises secured information using cryptographic operations.

12. The computer system as claimed in claim 10, wherein the pairing uses the one or more pairing codes registered for a payload at a pairing service for a limited amount of time and includes sending a cryptographically signed and/or encrypted payload via the live connection channel.

13. The computer system as claimed in claim 10, further comprising program instructions to:
receive a request to identify virtual contacts from the requesting application and an information receiving component for receiving information for use in establishing the subsequent connection between the first and second user devices via the requesting application.

14. The computer system as claimed in claim 10, wherein the information for establishing a subsequent connection includes information identifying the requesting application and identifying a user.

15. The computer system as claimed in claim 10, wherein the live connection channel is selected from the group consisting of: a channel that has a live real-time communication, a messaging channel that has sent or received a message within a predefined time period, and channel sharing a document for collaboration.

16. The computer system as claimed in claim 10, further comprising program instructions to:
broadcast a first message to running processes to indicate that the requesting application is attempting to discover and receiving a response to the first message by indicating availability to receive the paring codes via the live connection channel.

17. The computer system as claimed in claim 10, further comprising program instructions to:
broadcast a second message to running processes to indicate that the requesting application is attempting to share the one or more pairing codes and receiving a response to the second message by indicating availability to deliver the paring codes via the live connection channel.

18. The computer system as claimed in claim 10, further comprising program instructions to:
discover physically proximate user devices using near field communication protocols.

19. The computer system as claimed in claim 10, further comprising program instructions to:
use the subsequent connection for transactions between the requesting application and a corresponding application on the second user device.

20. A computer program product for establishing connectivity between user devices, the computer program product comprising a computer readable storage medium having program instructions embodied therewith, the program instructions executable by a processor to cause the processor to:
broadcast a message to running processes on an operating system of a first user device to indicate that a requesting application is looking for a live connection channel to attempt discovery with a second user device as a part of ascertaining virtual proximity of the first user device with the second user device;
receive a response from a live connection channel; and
verifying a pairing, between the first and second user device, via the responding live connection channel to confirm a virtual proximity of the second user device with the first user device, wherein the pairing includes broadcasting one or more pairing codes and communicating information for establishing a subsequent connection between the first and second user devices via future requests from the requesting application.

* * * * *